(12) United States Patent
Hou

(10) Patent No.: US 6,595,583 B2
(45) Date of Patent: Jul. 22, 2003

(54) LATCH MECHANISM FOR STROLLER SEAT

(75) Inventor: Hung-Chung Hou, Chia-I Hsien (TW)

(73) Assignee: Link Treasure Ltd., Tortola (VG)

( * ) Notice: Subject to any disclaimer, the term of this patent is extended or adjusted under 35 U.S.C. 154(b) by 0 days.

(21) Appl. No.: 09/908,652

(22) Filed: Jul. 20, 2001

(65) Prior Publication Data

US 2003/0015895 A1 Jan. 23, 2003

(51) Int. Cl.[7] .............................................. B60N 2/28
(52) U.S. Cl. ............... 297/130; 297/250.1; 297/256.17; 280/30; 280/47.38
(58) Field of Search ........................... 297/130, 256.16, 297/256.17; 296/65.03; 280/30

(56) References Cited

U.S. PATENT DOCUMENTS

| | | | |
|---|---|---|---|
| 4,861,105 A | | 8/1989 | Merten et al. |
| 5,201,535 A | | 4/1993 | Kato et al. |
| 5,203,577 A | | 4/1993 | Kato et al. |
| 5,567,008 A | * | 10/1996 | Cone, II ................ 297/256.16 |
| 5,676,386 A | * | 10/1997 | Huang ......................... 280/30 |
| 5,727,798 A | | 3/1998 | Walters et al. |
| 5,772,279 A | * | 6/1998 | Johnson, Jr. ................ 297/130 |
| 6,155,626 A | * | 12/2000 | Chabanne et al. ........ 296/65.03 |
| 6,318,807 B1 | * | 11/2001 | Perego ................... 297/440.22 |
| 6,367,875 B1 | * | 4/2002 | Bapst ....................... 297/250.1 |
| 6,375,260 B1 | * | 4/2002 | Hiramatsu et al. ...... 297/256.16 |
| 6,386,632 B1 | * | 5/2002 | Goor et al. ............. 297/216.11 |
| 6,428,100 B1 | * | 8/2002 | Kain et al. .............. 297/256.16 |

* cited by examiner

*Primary Examiner*—Peter M. Cuomo
*Assistant Examiner*—Stephen D'Adamo
(74) *Attorney, Agent, or Firm*—Birch, Stewart, Kolasch & Birch, LLP

(57) ABSTRACT

A structure for coupling a safety car seat or a stroller seat with a stroller to allow users to use two hands to grasp two sides of the safety car seat or stroller seat and to press a pushbutton adjacent to the palm to release a latch mechanism located below the seat without other people's help. The latch mechanism includes a pushbutton and a latch block. The pushbutton is located beside the handles at two sides of the safety car seat or stroller seat so that a user may grasp two sides of the stroller seat and press the pushbuttons and transmit the pressing force through a transmission mechanism to the latch block and to turn the latch block to release the seat.

5 Claims, 6 Drawing Sheets

LATCH MECHANISM FOR STROLLER SEAT

FIELD OF THE INVENTION

The invention relates to a safety car seat or stroller and particularly a child seat mountable to a stroller in a latched fashion or detachable from the stroller.

BACKGROUND OF THE INVENTION

Safety car seats or stroller seats that are fastenable to strollers have recently been in great demand. They allow sleeping infants or young children to be carried from the cars to the strollers, or from the strollers to the cars conveniently without interrupting the sleeping of the infants or children.

Numerous proposals and designs of this nature have been disclosed in the prior art. For instance, U.S. Pat. No. 4,861,105 to Barron C. Merten, et al. discloses an "Infant car seat mountable on a grocery cart." which has an infant car seat coupled with a handle located at a rear end to trigger a spring-controlled hook. When removing the infant car seat from the grocery cart, the handle is pulled to release the hook, and the infant car seat may be disengaged from the cart and taken away.

However Merten's design requires the user to grasp the car seat with one hand, and to pull the handle with other hand. In general, it is difficult for people to balance the car seat with only one hand. Removing the car seat directly from the grocery cart with one hand while the child is still in the car seat is risky. It would be safer to remove the child from the car seat first, then remove the car seat from the cart. However, doing so would wake the child if s/he is sleeping.

Another similar concept is disclosed in U.S. Pat. No. 5,201,535 to Hitoshi Kato, et al. titled "Folding stroller with detachable seat". It has a foldable body coupled with a latch mechanism. Users must move a handle located below the mechanism to release the seat from the latch mechanism before removing the seat. As the handle is located at a distance from the body where user's hand has to grasp, it is inconvenient or even risky for one person to maneuver the handle with one hand and to remove the seat body with the other hand. A similar design appears in U.S. Pat. No. 5,203,577 to Kato, et al. However, it does not offer solution to overcome the problem set forth above.

There are also many approaches being proposed to couple an infant carrier to a stroller. For instance, U.S. Pat. No. 5,727,798 to John Walters, et al. titled "Child stroller and infant carrier system" has a U-shape safety bar with a recess in its center located on the infant carrier, and a latch in front of the infant carrier for users to selectively couple the carrier to the stroller. When a user moves the latch, the infant carrier may be released from the U-shaped bar. Hence, a user may move the latch with one hand and remove the carrier by the handle with the other hand, which is more convenient.

Nevertheless, for lager size structures, such as those to couple a safety car seat to a stroller, or to couple a child seat to a stroller, there are usually no handles for users' hands to grasp. John Walters' design is thus inapplicable. Other alternatives and structures have to be considered.

SUMMARY OF THE INVENTION

The primary object of the invention is to change the structure of safety car seats, infant carriers or stroller seats, to make them capable of coupling with strollers, and also to make them easily removable from the strollers.

In the embodiments of the invention, a user may grasp two sides of the child seat (or infant carrier) with both hands, and press a pushbutton located adjacent to the palm to separate the child seat from the stroller, so that the child seat may be easily removed.

The invention provides a latch mechanism that includes at least a pushbutton and a latch block. The pushbuttons are located on both sides of the safety car seat or stroller seat to allow users to grasp with both hands. Through a transmission mechanism, the pressing force and action will be transmitted to the latch block and turn the latch block to release the latched engagement.

The foregoing, as well as additional objects, features and advantages of the invention will be more readily apparent from the following detailed description, which proceeds with reference to the accompanying drawings. The drawings are only for reference and illustrative purposes, and thus are not intended to limit the scope of the invention.

DESCRIPTION OF THE PREFERRED EMBODIMENTS

Figure 1:
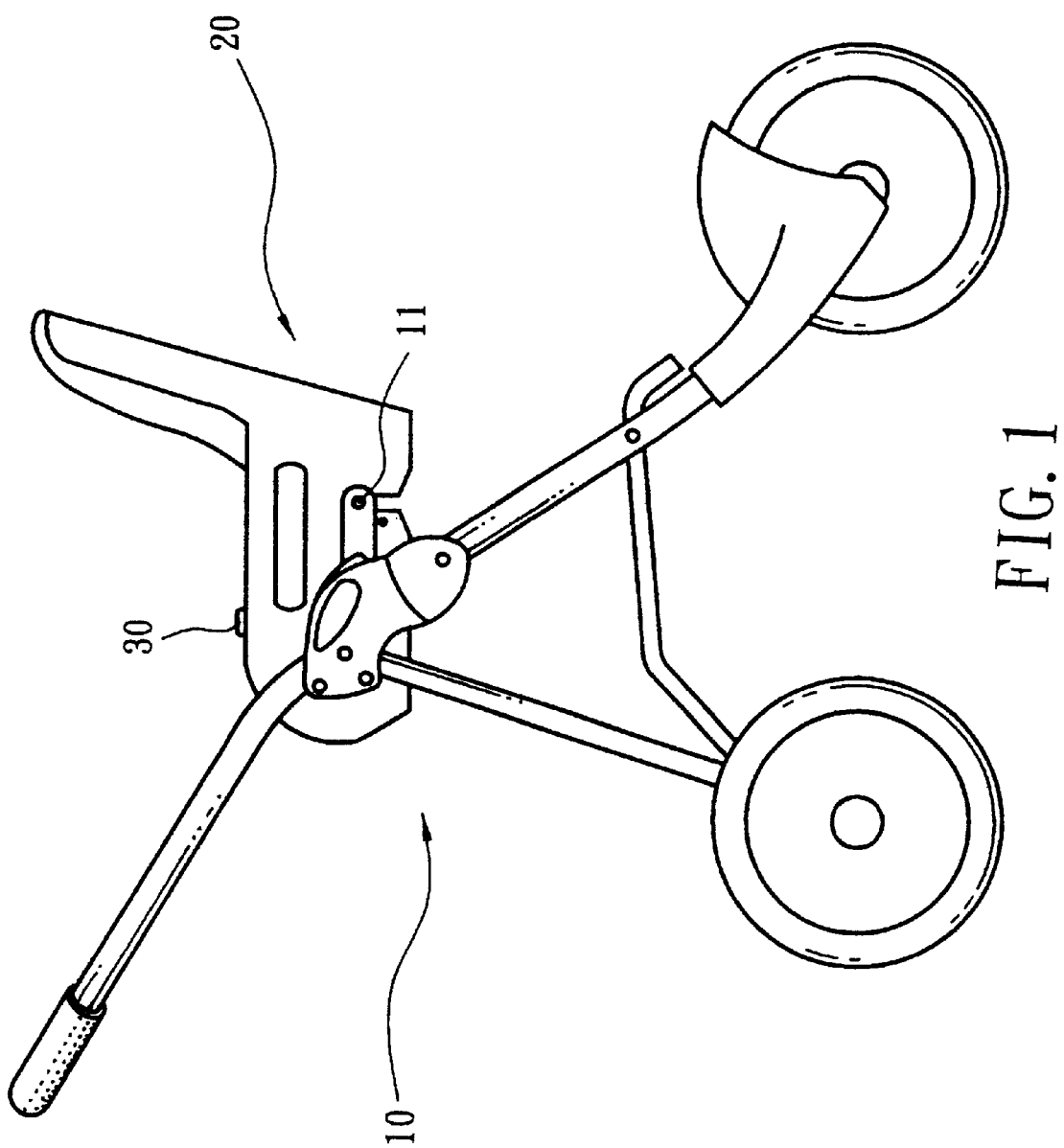
FIG. 1 is a schematic view of the invention with a safety car seat or stroller seat coupled to a general stroller.

Referring to FIG. 1, a safety car seat or stroller seat 20 is shown coupling with a stroller frame 10. According to the embodiments of the invention, a user may use both hands to grasp two sides of the safety car seat or stroller seat 20 and use the thumbs to press pushbuttons 30 located on two sides of the seat to release a latch mechanism located in the seat so that the stroller seat 20 may be disengaged from the latch and be removed from the stroller frame 10.

Figure 2:
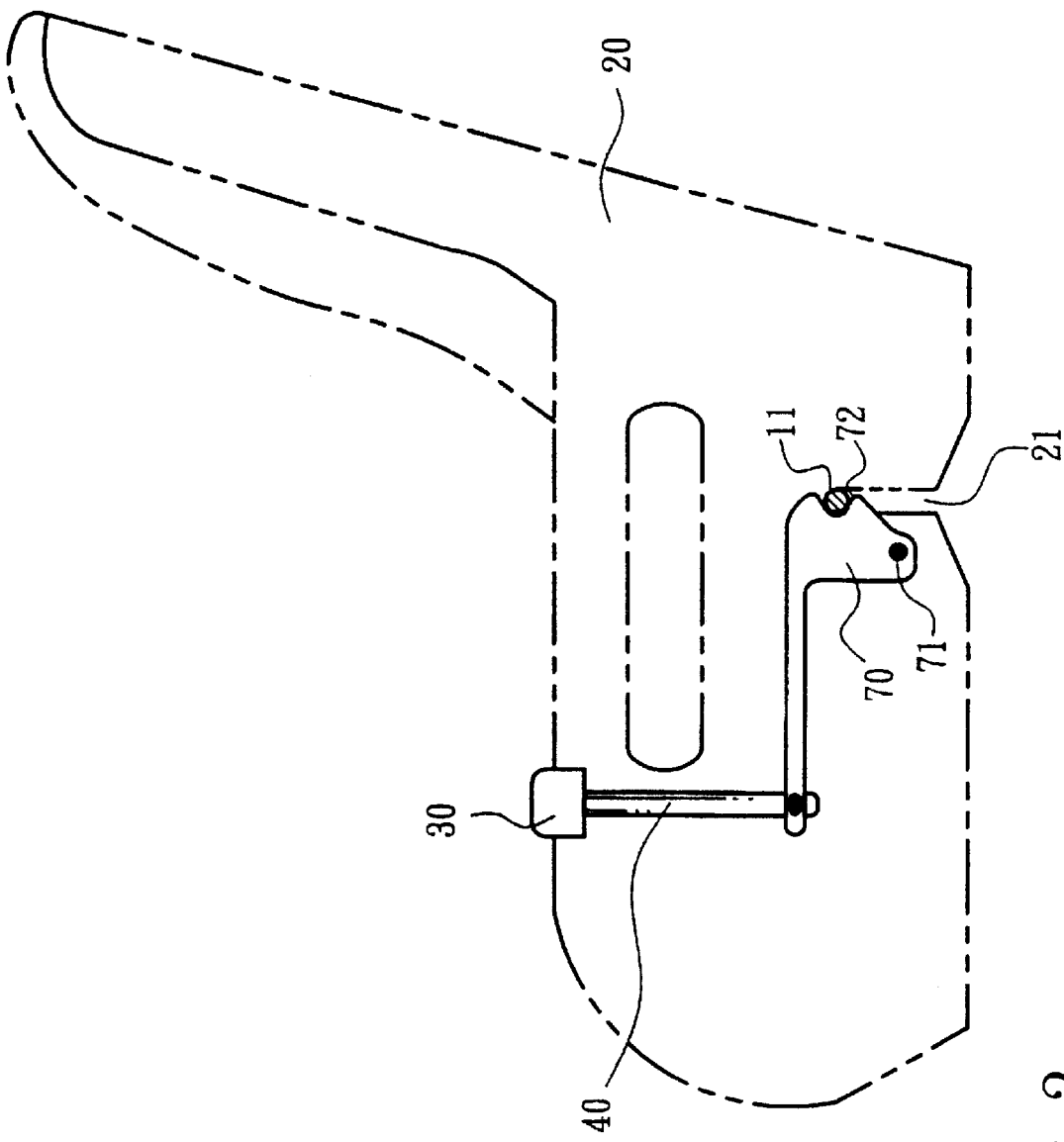
FIG. 2 is schematic view of a first embodiment of the invention.

Referring to FIG. 2, at each of the two sides of the car safety seat or stroller seat 20, in addition to the pushbutton 30 for controlling or releasing the latch mechanism, there is a slot 21 with an opening on the bottom, and a stub shaft or transverse bar 11 mounted in the stroller frame 10 and transversely located in the slot 21 to allow the stroller seat 20 to couple with and latch on the stroller frame 10.

The latch mechanism of the invention includes at least a pushbutton 30 and a latch block 70. The pushbutton 30 is located on either of the two sides of the stroller seat 20 to allow users to grasp the handles at two sides of the stroller seat 20 and press the pushbutton 30 at the same time. Through a transmission mechanism, the pressing force and action will be transmitted to the latch block 70, which will be turned to generate a releasing effect.

Referring to FIG. 2, the latch block 70 is located at a lateral side of the stroller seat 20 and is pivotally engaged with a pivot shaft 71. The latch block 70 may turn about the pivot shaft 71 and switch between a first position and a second position. The latch block 70 has an engaging notch 72 which, while in the first position, will extend into the slot 21 beneath the stroller seat 20 to latch on the stub shaft or transverse bar 11 such that the stub shaft 11 is not allowed to move out of the slot 21. In the second position, the engaging notch 72 is moved away from the slot 21 to allow the stub shaft or transverse bar 11 to move freely.

In order to make the stroller seat 20 automatically latch on the stub shaft or transverse bar 11, the invention employs an elastic element such as a spring to keep the latch block 70 in the first position. When the pushbutton 30 is pressed, the transmission mechanism transmits the pressing force to move the latch block from the first position to the second position. The stub shaft or transverse bar 11 then releases from the stroller seat 20 and allows the stroller seat 20 to disengage from the latch and be moved away.

The transmission mechanism may be a rigid member 40 which has an upper end attached to the pushbutton 30 and a lower end engaged with the latch block 70. When the pushbutton 30 is pressed downwards, the rigid member 40 drives the latch block 70 to turn about the pivot shaft 71. As a result, the engaging notch 72 will be moved away from the slot 21 and the stroller seat may be moved away from the stroller frame 10.

Figure 3:
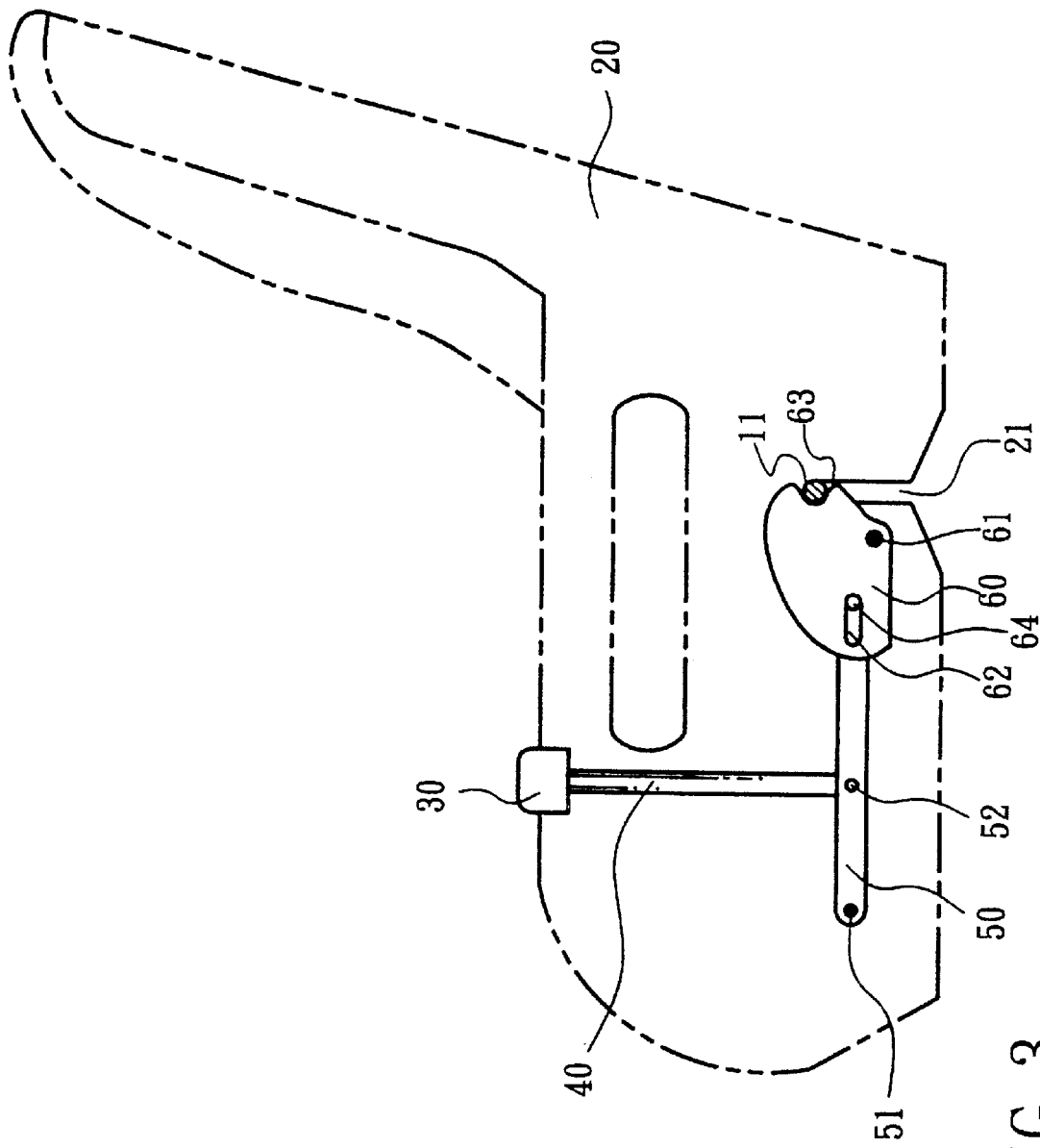
FIG. 3 is a schematic view of a second embodiment of the invention, with a rocker lever to amplify the displacement of the pushbutton and the turning angle of the latch block.
Figure 4:
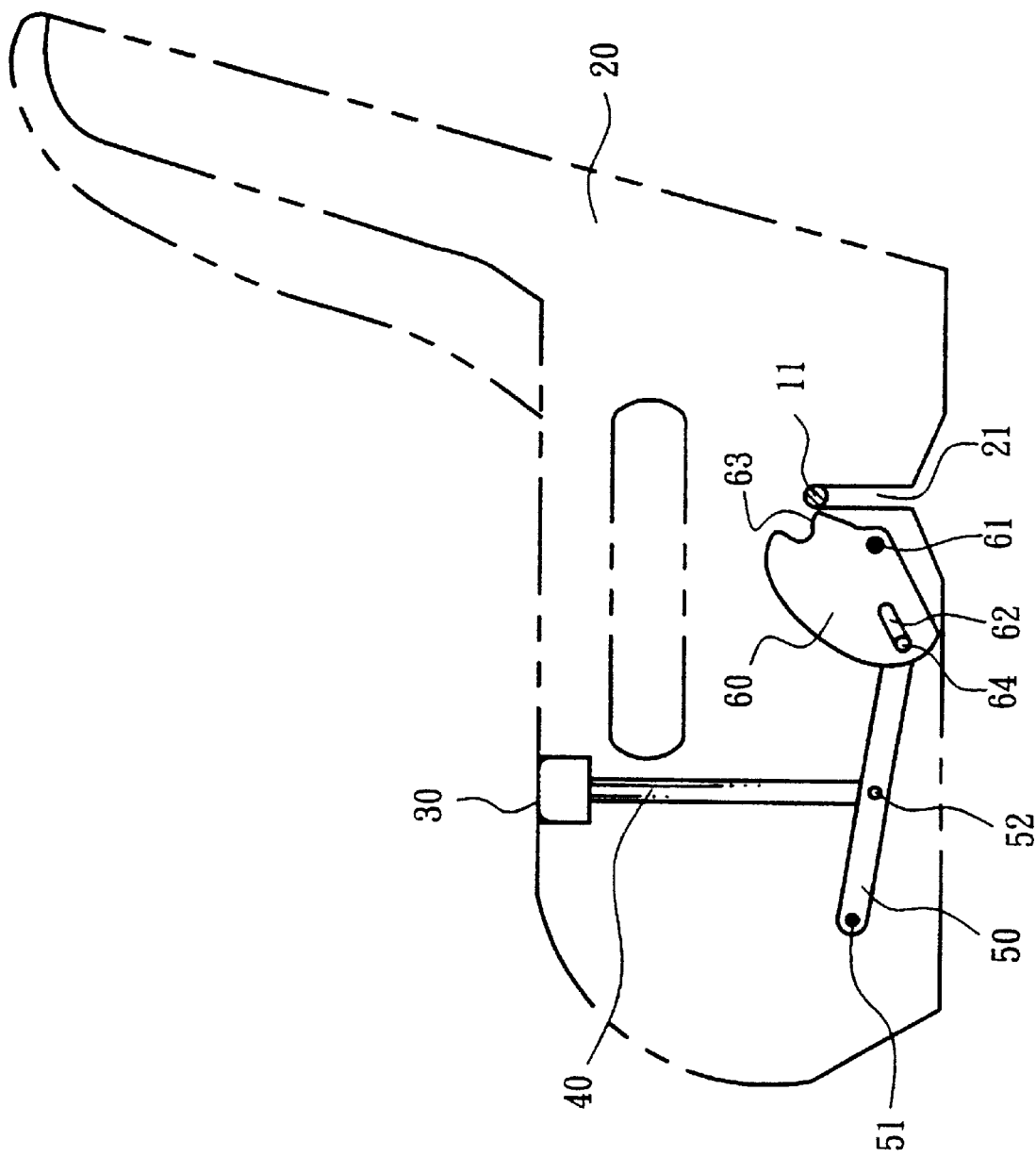
FIG. 4 is a schematic view of the second embodiment in use, with the pushbutton pressed downwards and the latch block released.

FIG. 3 illustrates another embodiment for increasing the turning angle of the latch block 70. The transmission mechanism, in addition to the rigid member 40, has a rocker lever 50 that has one end pivotally engaged with the lateral side of the stroller seat at a pivot shaft 51 and the other end engaged with one side of the latch block 60. The rocker lever 50 is engaged with the rigid member 40 at a pivot point 52 located at the middle section of the rocker lever 50. As shown in FIG. 4, when the pushbutton 30 is pressed downwards, the rocker lever 50 turns about the pivot shaft 51. The moving path of the other end of the rocker lever 50 becomes greater than that of the pivot point 52 to enlarge the displacement of the pushbutton 30. Hence, the latch block 60 will be turned and moved from the first position to the second position farther away, so that the engaging notch 63 may be completely moved away from the slot 21.

In order to prevent interference between the elements during movement, a slot 62 may be formed in the latch block 60 as shown in FIGS. 3 and 4, and a stub pin 64 or the like may be attached to the rocker lever 50, pivotally engaging with the slot 62. Another alternative is to have a slot 53 formed at one end of the rocker lever 50, and a stub pin 54 or the like attached to the latch block 60, pivotally engaging with the slot 53 as shown in FIG. 5.

Figure 6:
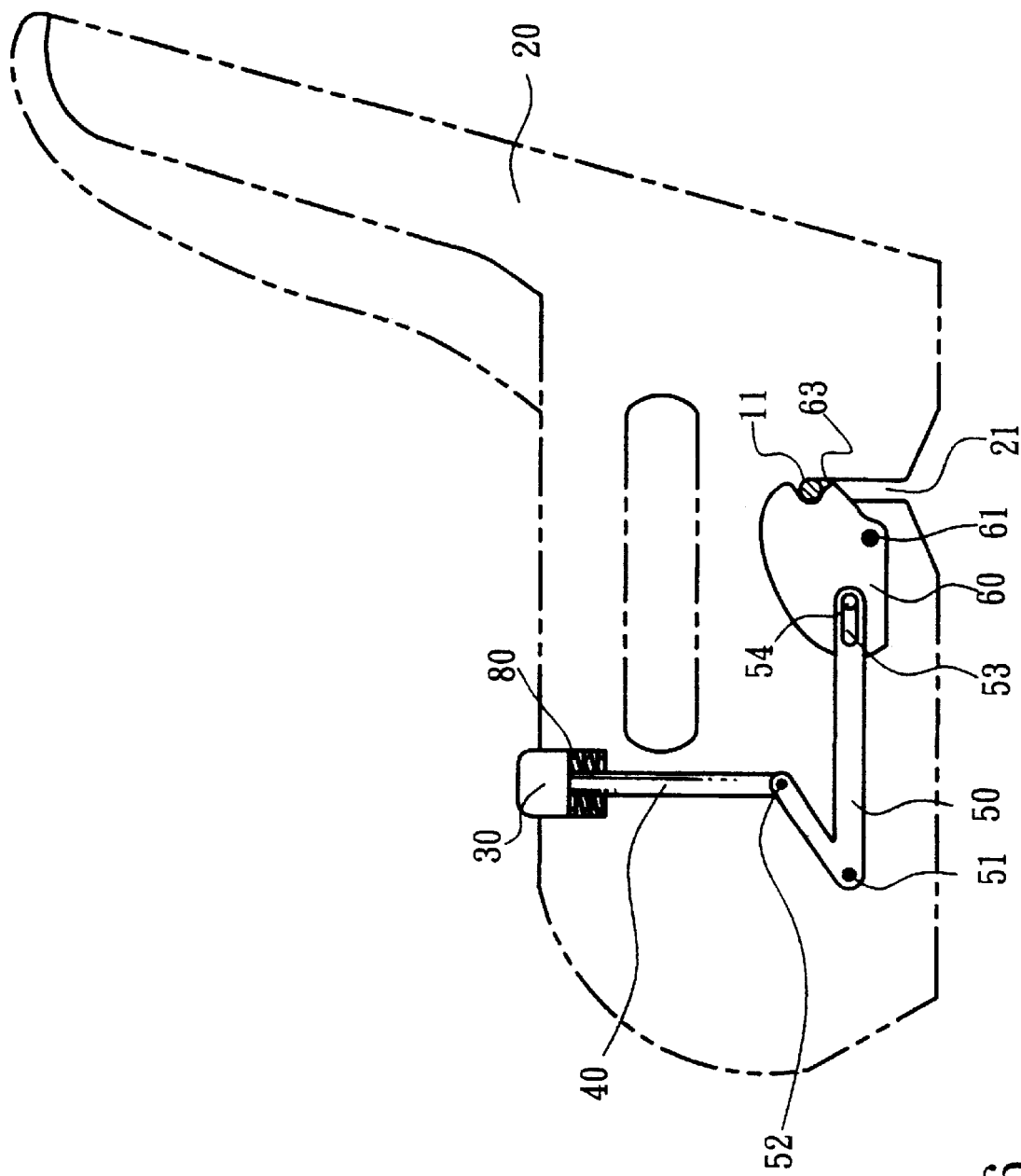
FIG. 6 is a schematic view of a fourth embodiment of the invention, adding a spring and a rocker lever of a bent shape.

FIG. 6 shows another embodiment in which the rocker lever 50 has a bent shape with one end pivotally engaging with the rigid member 40, the middle portion pivotally engaging with one side of the stroller seat 20 at a pivot shaft 51, and the other end pivotally engaging with the latch block 60. When the pushbutton 30 is pressed downwards, the rocker lever 50 turns about the pivot shaft 51 to allow the other end to amplify the displacement of the pushbutton 30. The latch block 60 will be driven and turned about the pivot shaft 61, and moved from the first position to the second position to release from the latched state.

Figure 5:
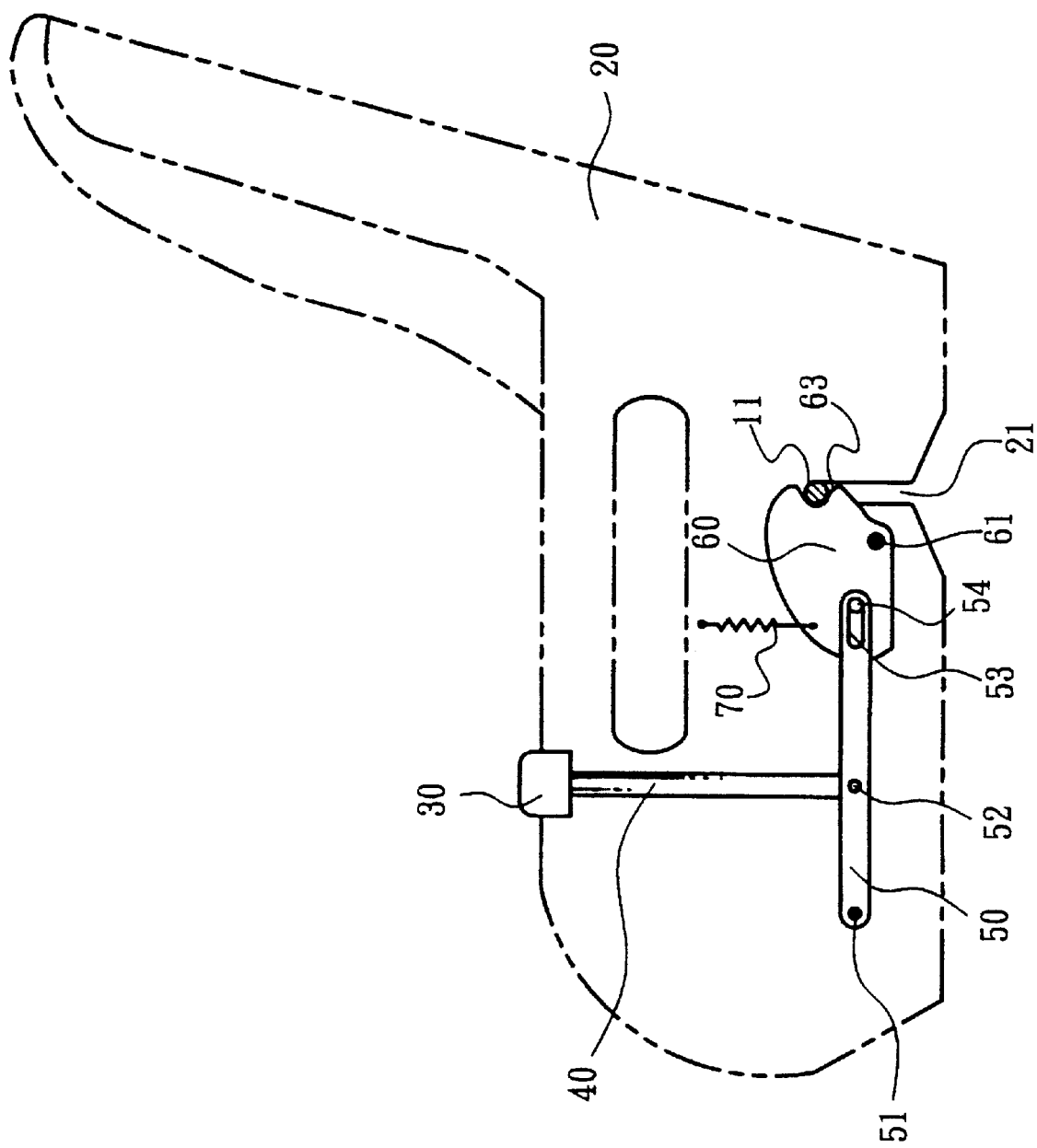
FIG. 5 is a schematic view of a fourth embodiment of the invention, adding a spring and having a slot on the rocker lever.

Referring to FIGS. 5 and 6, in order to equip the pushbutton 30 with a self-restoring capability, a spring 80 is disposed below the pushbutton to provide an uplift force. A spring 70 may also be disposed at one side of the latch block 60 as shown in FIG. 5 to provide the returning force required and indirectly move the pushbutton 30 upwards to its original position. By the same token, an elastic element or spring may be deployed to engage with the rocker lever in any of the embodiments set forth above, to give the pushbutton 30 a restoring force and to bias the latch block 60 to the first position.

While the preferred embodiments of the invention have been set forth for the purpose of disclosure, modifications of the disclosed embodiments of the invention as well as other embodiment thereof may occur to those skilled in the art. Accordingly, the appended claims are intended to cover all embodiments which do not depart from the spirit and scope of the invention.

What is claimed is:

1. A latch mechanism for a stroller seat located at one side of the stroller seat which has a slot formed at a lower portion thereof and straddled over a stub shaft or a transverse bar located in a stroller such that the latch mechanism is engageable with the stub shaft or the transverse bar in the slot to couple the stroller seat to the stroller, the latch mechanism comprising:

a pushbutton located on the surface of the handle of the stroller seat;

a latch block pivotally engaged to one side of the stroller seat and turnable about a pivot shaft between a first position and a second position, the latch block having an engaging notch extended into the slot to latch the stub shaft or the transverse bar for preventing the stub shaft or the transverse bar from moving out of the slot at the first position, and the engaging notch being moved away from the slow to allow the stub shaft or the transverse bar moving away freely from the slot at the second position;

an elastic element for urging the latch block to bias to the first position; and a transmission mechanism located between the pushbutton and the latch block for transmitting pressing force applied by an user on the pushbutton to make the latch block switching from the first position to the second position, wherein the transmission mechanism includes:
a rigid member having one end attached to the pushbutton; and
a rocker lever having a first end pivotally engaged to one side of the stroller seat and a second end engaged with the latch block, and engaging with the rigid member at a position between the first end and the second end.

2. The latch mechanism of claim 1, wherein the elastic element is located below the pushbutton for restoring the pushbutton to its original position.

3. The latch mechanism of claim 1, wherein the elastic element directly engages with the latch block for biasing the latch block to the first position.

4. The latch mechanism of claim 1, wherein the second end of the rocker lever has a slot pivotally engaging with a stub pin attached to the latch block.

5. The latch mechanism of claim 1, wherein the latch block has a slot pivotally engaging with a stub pin attached to the rocker lever.

* * * * *